US011027292B2

(12) United States Patent
Russell

(10) Patent No.: US 11,027,292 B2
(45) Date of Patent: Jun. 8, 2021

(54) DOUBLE FILTER WITH PASS-THROUGH AND METHOD FOR DYNAMICALLY COMPENSATING FOR THE INLET FLUID CONTAMINATION

(71) Applicant: DLHBOWLES, INC., Canton, OH (US)

(72) Inventor: Gregory Russell, Catonsville, MD (US)

(73) Assignee: DLHBOWLES, INC., Canton, OH (US)

(*) Notice: Subject to any disclaimer, the term of this patent is extended or adjusted under 35 U.S.C. 154(b) by 235 days.

(21) Appl. No.: 15/719,177

(22) Filed: Sep. 28, 2017

(65) Prior Publication Data

US 2018/0078952 A1  Mar. 22, 2018

Related U.S. Application Data

(63) Continuation of application No. PCT/US2016/025675, filed on Apr. 1, 2016.

(60) Provisional application No. 62/142,072, filed on Apr. 2, 2015.

(51) Int. Cl.
| | |
|---|---|
| *B05B 1/08* | (2006.01) |
| *B05B 15/40* | (2018.01) |
| *B01D 29/44* | (2006.01) |
| *F15C 1/22* | (2006.01) |

(52) U.S. Cl.
CPC ............... *B05B 1/08* (2013.01); *B01D 29/44* (2013.01); *B05B 15/40* (2018.02); *F15C 1/22* (2013.01)

(58) Field of Classification Search
CPC ........... B05B 1/08; B05B 15/40; B01D 29/44; F15C 1/22

USPC ................. 239/589.1, 284.1–284.2
See application file for complete search history.

(56) References Cited

U.S. PATENT DOCUMENTS

| | | | | |
|---|---|---|---|---|
| 4,508,267 A | * | 4/1985 | Stouffer | B05B 1/08 137/835 |
| 4,516,289 A | * | 5/1985 | Sumerau | A47L 9/325 15/143.1 |
| 4,520,961 A | * | 6/1985 | Hueber | B60S 1/52 239/284.1 |
| 5,074,471 A | * | 12/1991 | Baumgarten | B60S 1/522 239/284.1 |
| 5,636,794 A | * | 6/1997 | Hess | B05B 1/08 137/539 |
| 6,457,658 B2 | | 10/2002 | Srinath et al. | |

(Continued)

FOREIGN PATENT DOCUMENTS

WO    WO2014093590    6/2014

OTHER PUBLICATIONS

International Search Report in corresponding PCT Application No. PCT/US2016/025675, dated Aug. 8, 2016.

(Continued)

Primary Examiner — Chee-Chong Lee
(74) Attorney, Agent, or Firm — McDonald Hopkins LLC

(57) ABSTRACT

A multiple-fluidic circuit substrate structure with an integral inter-circuit bypass lumen effectively provides multiple parallel filtered fluid inlets having filtered fluid outlets with at least one inter-circuit pass-through channel in fluid communication between the filtered fluid outlets to automatically provide full flow of filtered fluid to each of a plurality of fluidic circuits or to two or more circuits even if one fluidic circuit's corresponding inlet fluid filter is clogged.

9 Claims, 7 Drawing Sheets

(56) References Cited

U.S. PATENT DOCUMENTS

2003/2034303      12/2003  Berning et al.
2006/0226266 A1   10/2006  Russell et al.
2007/0257133 A1   11/2007  Bettenhausen et al.
2014/0042102 A1    2/2014  Chancellor

OTHER PUBLICATIONS

European Patent Office, Supplementary European Search Report for EP App. No. 16774357 dated Oct. 18, 2018.

* cited by examiner

SECTION A-A

DOUBLE FILTER WITH PASS-THROUGH AND METHOD FOR DYNAMICALLY COMPENSATING FOR THE INLET FLUID CONTAMINATION

RELATED APPLICATION INFORMATION

This application is a continuation of International Application No. PCT/US2016/025675, filed on Apr. 1, 2016, which claims priority to commonly owned U.S. App. No. 62/142,072, entitled "Double Filter with Pass-Through and Method for Dynamically Compensating for Inlet Fluid Contamination", filed on Apr. 2, 2015, the entire contents of which are incorporated herein by reference.

BACKGROUND OF THE INVENTION

Field of the Invention

The present invention relates, in general, to nozzle assemblies and sprayers supplied by fluid sources which may be contaminated with particles or other contaminants. More particularly, the invention is directed to solving the problem caused by clogging of fluid flow devices such as nozzles and sprayers by contamination of the fluid.

Discussion of the Prior Art

Fluidic devices, such as the fluid oscillators illustrated in FIGS. 1 and 2, and described in greater detail in U.S. Pat. No. 6,186,409, issued Feb. 13, 2001, are well known in the prior art, and are particularly useful in liquid spray applications such as washer nozzles. Fluidic circuit oscillators generate oscillating sprays of droplets at an outlet aperture by generating moving vortices of fluid which flow through internal channels and chambers having dimensions which are carefully engineered to create and maintain internal flow oscillations caused by these moving vortices. These devices are typically manufactured of molded plastic and may comprise a fluid oscillator circuit OC or silhouette 10 molded in one surface 12 of a chip or insert 14 and a housing 16 incorporating a cavity 18 into which the chip or insert 14 is forcibly inserted to produce a specialized nozzle assembly. Fluid under pressure to be sprayed is supplied to the fluidic device by way of an inlet pipe or barb 20 in the housing directing fluid into to a power nozzle PN molded in the chip and forming part of the fluid oscillator circuit OC. Care is taken in the design to assure a seal between the internal surfaces of the housing cavity 18 and the mating surfaces of the chip or insert 14 so that the fluid is directed through the oscillator circuit to its outlet aperture OA.

In mass manufacturing of such chips, housings or the pumps or fittings which provide a steady supply of pressurized fluid, loose plastic particles can be produced which can be carried by fluid flow through the device. Fluid supplies can also be contaminated by users who may not refill with perfectly clean fluids. When the fluid supply is contaminated with particles or other contaminants, solids or debris in the fluid, one or more of the fluidic circuit's internal orifices or pathways may be clogged, hindering or even preventing the desired oscillations and thereby blocking the flow of washer liquid, in the case of a washer nozzle, for example, and, in the case of fluid oscillators, interrupting the oscillation function. There have been efforts to place screens or discrete filters upstream of the fluid circuit to prevent clogging, but these expedients add cost and complexity to these devices, and did not provide a satisfactory solution.

In response, the applicant developed filter structures designed to strain out the debris from inlet fluid, and those designs have provided some relief, in certain applications. For example, applicant's prior patents include U.S. Pat. Nos. 7,014,131 and 6,457,658, which describe 2-level nozzles with a filter for inlet fluid, and U.S. Pat. No. 6,186,409 (discussed above) which describes another filter structure. All of these commonly owned patents are hereby incorporated herein by reference. As there described, this potential for clogging fluid oscillators gave rise to the placement of a filter in the fluid path on the chip itself, as illustrated in FIG. 2, herein, the filter incorporating spaced filter posts 24, as described in greater detail in the above-mentioned '409 patent. The filter and the fluid circuit define liquid flow paths with extra places or enlargements and spaced posts in which contaminants or loose particles will lodge or become trapped. The filter posts are located in areas other than main flow areas so that there are additional flow passages or ways for liquid to flow if a contaminant or particle blocks one or more passages or spaces between posts.

It has been found, however, that in fluidic circuit equipped nozzle assemblies, ordinary integrated filters can be substantially clogged by a single large piece of debris such as cardboard, paper, or packaging materials, and if the inlet filter is clogged, the result is no better than if a fluidic circuit's internal orifice is clogged, because the nozzle assembly is rendered significantly less effective for creating and maintaining the desired spray. There is a need, therefore, for an effective filter structure and method for overcoming the problems with prior art fluidic circuit nozzle assemblies.

OBJECTS AND SUMMARY OF THE INVENTION

Accordingly, it is an object of the present invention to overcome the above mentioned difficulties by providing an effective filter structure and method.

It is another object of the invention to provide a fluidic spray device or nozzle having an effective fluidic device filter structure and method for ensuring a continuous output flow in the presence of contaminants.

Briefly, and in accordance with the invention, a fluidic spray nozzle incorporates a new multiple-fluidic circuit substrate having multiple oscillator chambers and corresponding outlet apertures and incorporating multiple filtered flow paths leading through power nozzles to corresponding oscillator chambers. At least one integral inter-circuit bypass lumen is located in the substrate downstream of the filters to effectively provide a double filter for each oscillator chamber and its outlet. The filtered fluid in each circuit can either flow directly through its filter to its corresponding oscillator chamber and outlet aperture or through the lumen to the other oscillator chamber and outlet aperture to allow full flow to each oscillator chamber or to two or more chambers even if one circuit's inlet fluid filter is clogged.

In an exemplary embodiment having first and second fluidic circuits, each sharing a common supply of inlet fluid, a unitary integral structure which defines first and second fluidic circuits with corresponding first and second integrated filters are included on respective first and second opposing sides of a molded fluidic chip member or substrate. A flow pass-through, or lumen, is provided downstream of the filters to interconnect the first and second fluidic circuits. Each filter and the pass through are made with enough cross sectional lumen (flow accommodating) area to allow for full flow to each of the fluidic circuits but with small enough filter spacing to strain debris from the inlet fluid and prevent clogging of the various orifices in the fluidic circuits.

In accordance with one embodiment of the invention, a multiple-circuit fluid spray device comprises a fluid oscillator circuit substrate, or chip, having an input end, first and second fluidic circuits defined in corresponding first and second opposed sides of the chip, and an output end which is transverse to the first and second sides and to a plane parallel to and between the sides. The fluidic circuits are generally parallel to each other; that is, they provide two similar flow paths extending the length of and on opposite sides of the single substrate from individual inlets to corresponding outlets to produce a desired multi-spray outlet pattern. The first side fluidic circuit includes a first subchamber having an upstream end and a downstream end and a first filter between these ends, with the upstream end being in registry with the input end of the substrate to receive fluid from a source. The second side fluidic chamber on the substrate includes a second subchamber having an upstream end and a downstream end and a second filter dividing the upstream and downstream ends of the second subchamber, with the upstream end being in registry with the input end of the substrate to receive fluid from a source of liquid, typically the same fluid source. The first and second fluidic circuits are interconnected downstream of the respective first and second filters by an inter-circuit transverse bypass lumen or fluid flow path extending between the downstream end of the first subchamber and the downstream end of the second subchamber.

The first side of the substrate further includes a first fluid oscillator chamber having an inlet aperture in communication with the bypass lumen via power nozzles and having an outlet throat leading through an outlet orifice to ambient at the output end of the substrate to spray fluid to ambient. Similarly, the second side of the substrate includes a second fluid oscillator chamber having an inlet aperture in communication with the bypass lumen via power nozzles and having an outlet throat leading through an outlet orifice to ambient at the output end of the substrate to spray fluid to ambient.

The substrate is enclosed in a housing that includes at least one fluid inlet port that is in fluid communication with the upstream ends of the two fluidic circuits in the substrate so that the inlet port simultaneously provides inlet fluid to the upstream ends of the two circuits. Inlet fluid flowing through the first or second subchambers first passes through corresponding filters and then may pass either directly or through the transverse lumen into the first or second fluidic oscillators. In this way, if either of the filters becomes blocked, inlet fluid can still flow from the inlet port to both of the outlet orifices.

The novel method of the present invention, broadly speaking, incorporates steps for maintaining constant fluid spray outputs in a multi-circuit fluidic spray device even if one of the circuits becomes partially or completely clogged by debris in the supplied fluid. The method includes supplying at least first and second parallel fluidic circuits with fluid from a common source of fluid under pressure to provide first and second output sprays in a desired spray pattern. The method includes directing the fluid flowing in each of the parallel circuits through corresponding first and second fluid flow paths to respective first and second spray outlets, filtering the fluid in each of the fluid flow paths; and compensating for filter blockage in a first one of the fluid flow paths by directing a portion of fluid flow in a second one of the fluid flow paths to the first one of the flow paths to maintain constant flow at both of the spray outlets.

The method of directing the fluid flow in each of the circuits through corresponding first and second fluid flow paths includes supplying filtered fluid in each of the first and second flow paths to corresponding first and second oscillation chambers via respective power nozzles to direct oscillating fluid to respective spray outlets. Compensating for filter blockage in a first one of the fluid flow paths comprises directing a portion of fluid flow in the second one of the fluid flow paths to the first one of the flow paths by way of a bypass lumen extending between the circuits downstream of filters in each of said flow streams.

BRIEF DESCRIPTION OF THE DRAWINGS

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components, and wherein.

DESCRIPTION OF THE PREFERRED EMBODIMENT

Figure 1:
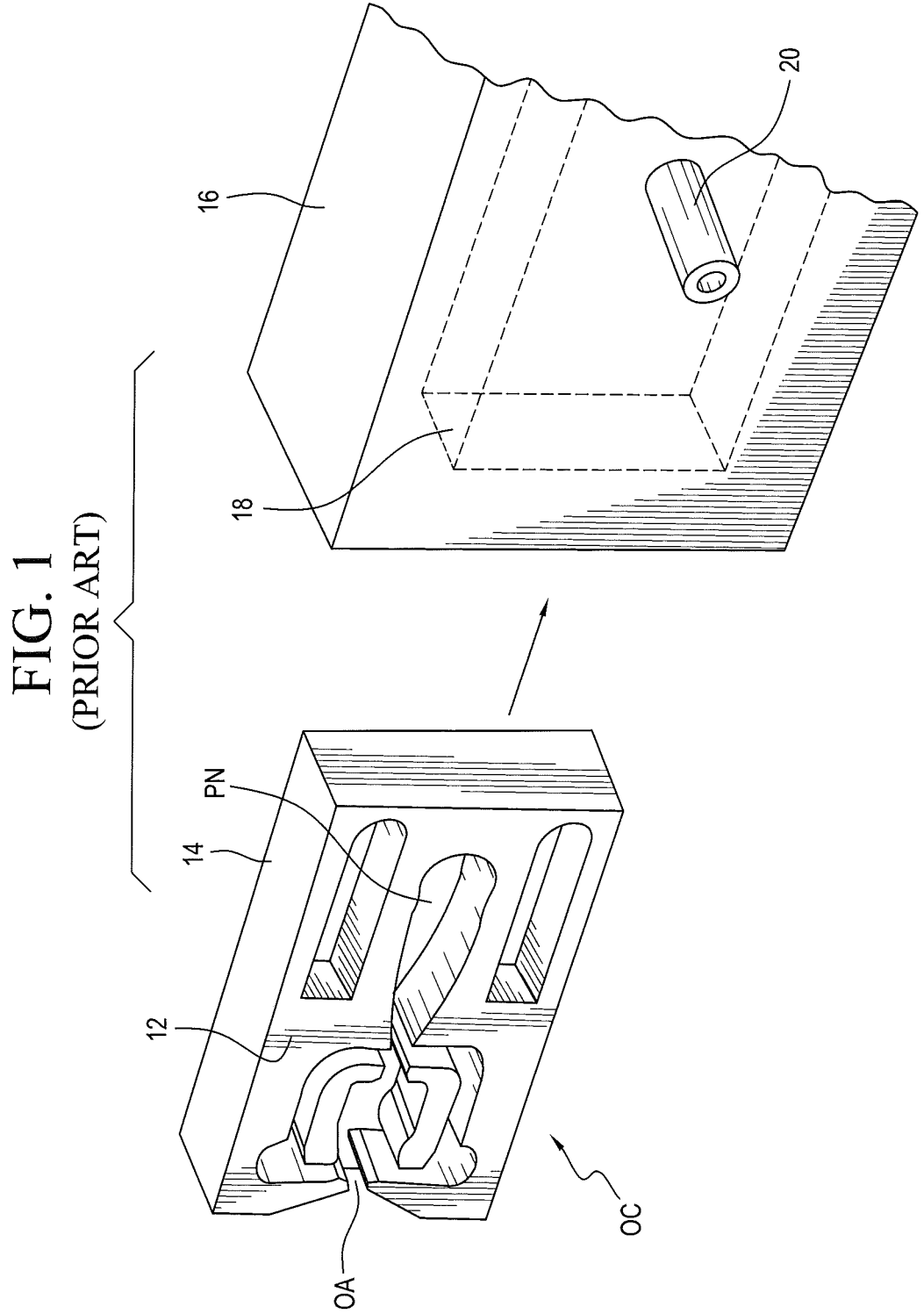
FIGS. 1 and 2 illustrate a fluid spray nozzle, or sprayer, incorporating a prior art fluidic circuit formed in a substrate and having an integral filter.
Figure 2:
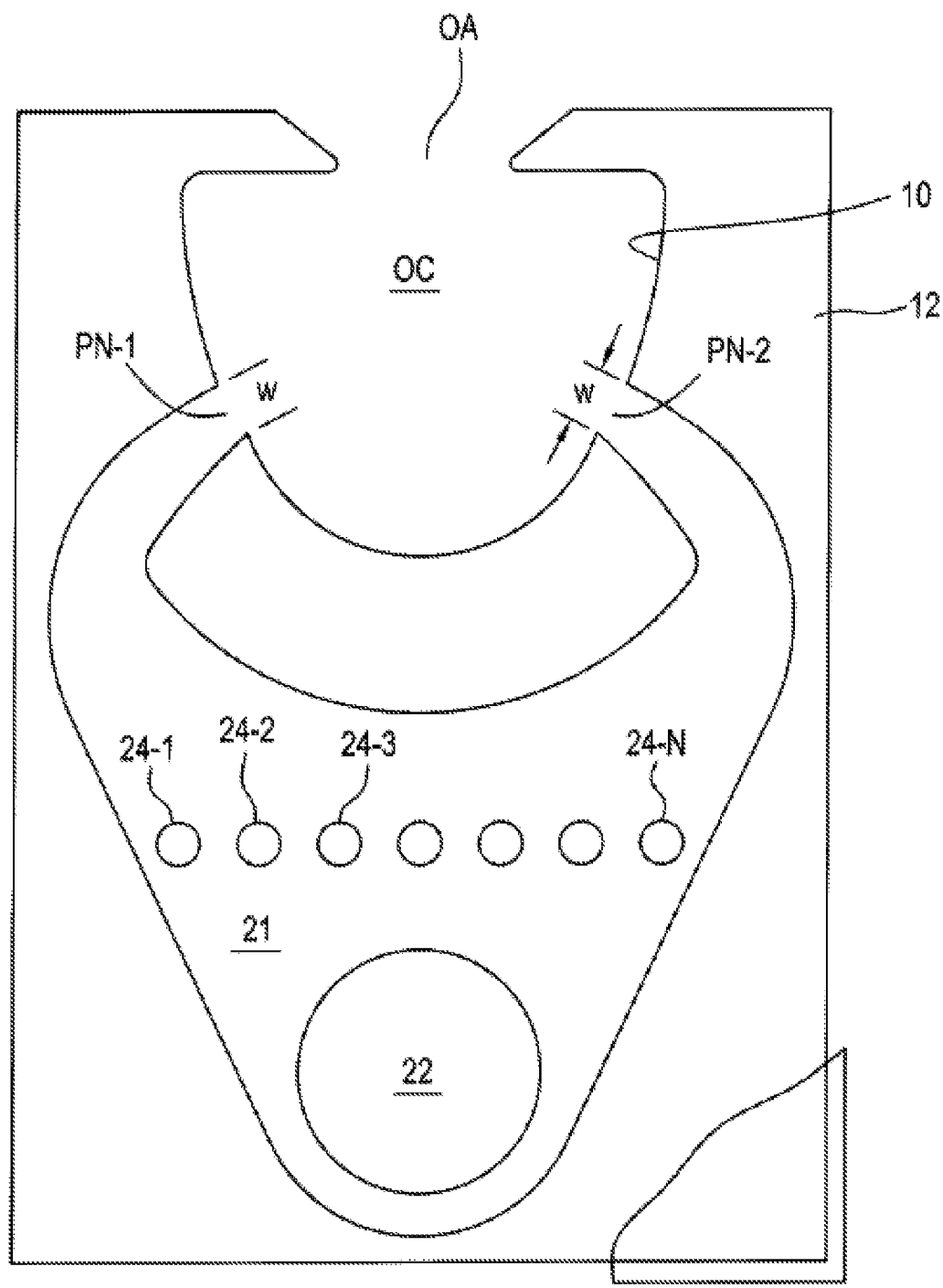

Referring now to a more detailed consideration of an illustrative embodiment of a fluidic spray nozzle device in accordance with the present invention, FIGS. 3-6 illustrate a two-sided multiple-fluidic-circuit substrate 30 having a first or top side 32 and an opposing, parallel second or bottom side 34, an inlet end 36 and an outlet end 38 perpendicular to the top and bottom sides, and opposed side walls 40 and 42. Located in the top side 32 of the substrate is a first fluidic circuit generally indicated at 50 that is formed in the substrate 30 as by molding in a plastic substrate material in known manner, and which incorporates an inlet end 52 and an outlet end 54. Similarly, a second fluidic circuit generally indicated at 60 is formed in the bottom side 34 of the substrate 30, again as by molding in the plastic substrate material in known manner, and which incorporates an inlet end 62 and an outlet end 64.

Figure 3:
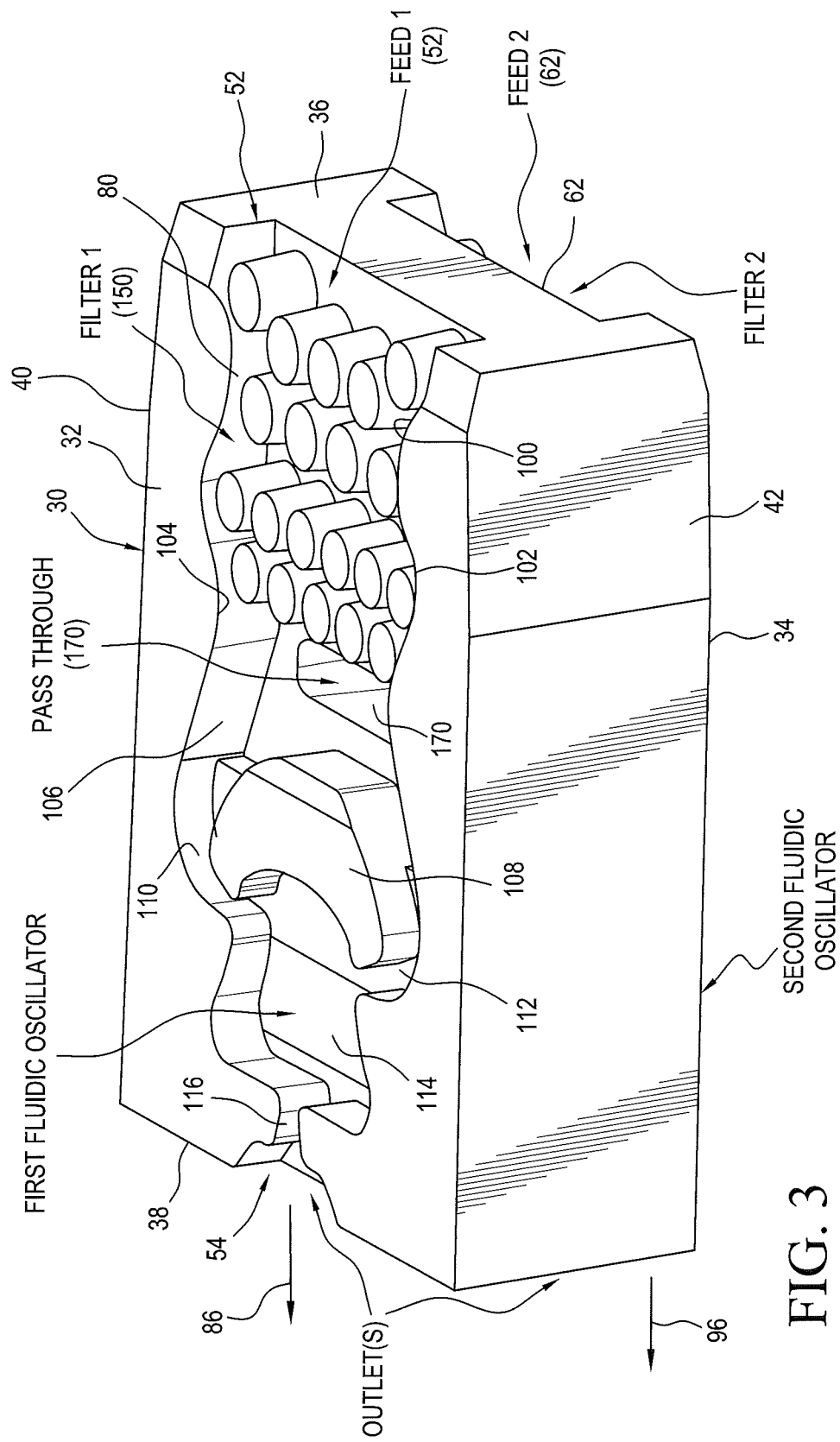
FIG. 3 is a perspective view of a multiple-circuit fluid spray nozzle device in accordance with the present invention and comprising a two-sided fluidic oscillator circuit substrate or insert having filter-equipped fluidic circuits on opposing sides of the substrate and a "bypass" lumen passing transversely through the substrate downstream of the filters.
Figure 4:
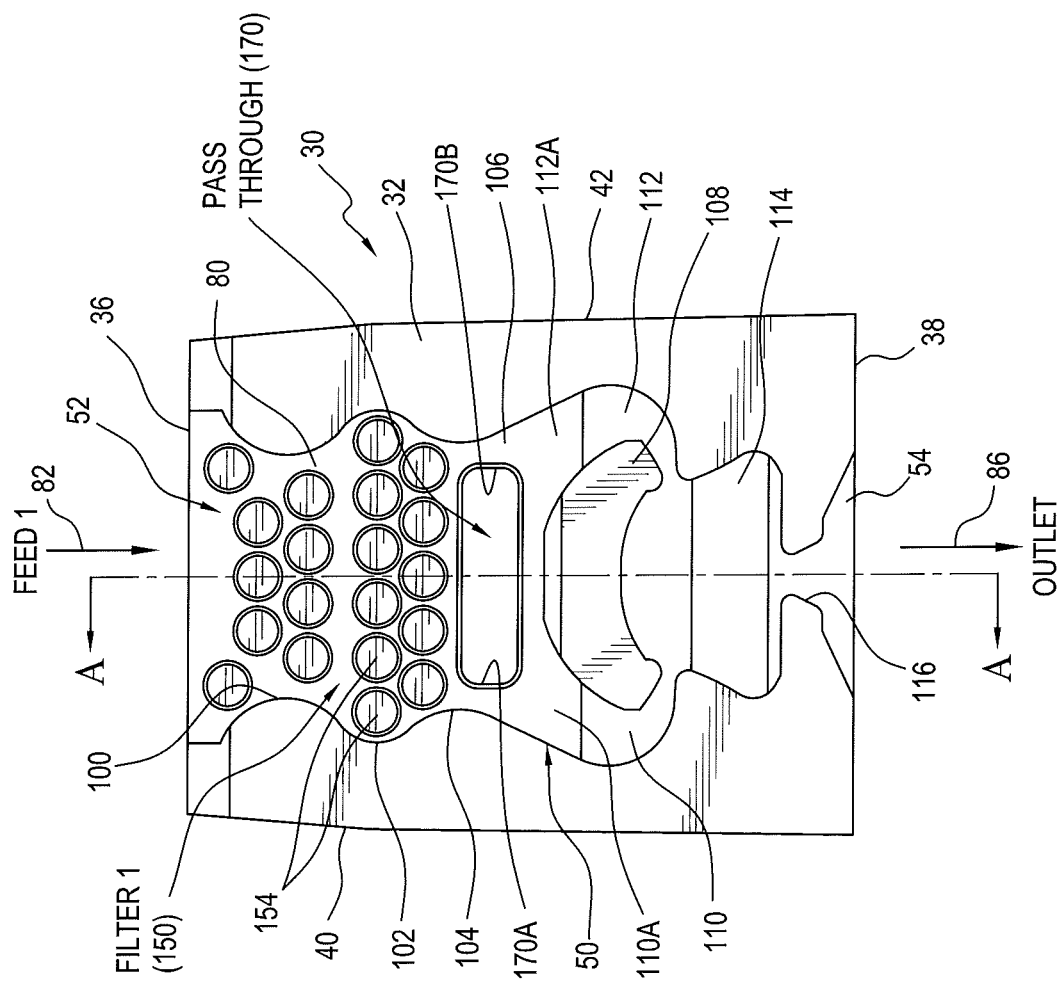
FIG. 4 is a top plan view of the substrate of FIG. 3 illustrating the first side's filter section, proximate the first side's feed from the fluid supply which provides filtered fluid flow to the transverse bypass lumen and then to the first side's fluidic oscillator section which creates a first spray from the first side's outlet orifice.

The first side fluidic circuit 50 on the first or top side 32 of the substrate may take a variety of forms, but in the embodiment best illustrated in FIGS. 3 and 4, incorporates a first fluid filtering subchamber 80 at its inlet or upstream end 36 which receives fluid, indicated by arrow 82 ("Feed 1"), to be dispensed, or sprayed, by the device from its outlet, or downstream end 54 as indicated at arrow 86. Similarly, the second side fluidic circuit 60 on the bottom side 34 of the substrate may take a variety of forms, which in the embodiment illustrated in FIG. 6 incorporates a second fluid filtering subchamber 90 at its inlet, or upstream end 62 which receives fluid, indicated by arrow 92 ("Feed 2"), to be dispensed, or sprayed by the device from its outlet end 64 as illustrated by arrow 96.

In the fluidic circuit embodiment illustrated best in FIGS. 3 and 4, the side walls of first fluid filtering subchamber 80 form an inwardly curving lumen 100 downstream from the inlet end 52, an outwardly curved portion 102, and the inwardly curved sidewalls terminate distally or downstream in a first filtered fluid supply orifice or throat 104 directing fluid from the first fluid filtering subchamber 80 to a pass-through chamber 106. Pass through chamber 106 includes transverse bypass lumen 106 which is in fluid communication with the passages defined in opposing side of two-sided fluidic oscillator circuit substrate or insert 30. Downstream from the first side pass-through chamber 106 is the first fluidic oscillator's fluid dynamic structural members including a curved baffle 108 which cooperates with the sidewalls of the first fluidic circuit 50 to form two spaced, inwardly tapered power nozzles 110 and 112 which accelerate and direct fluid 82 flowing through the first side's fluidic circuit 50 into a fluidic oscillator interaction chamber 114. The fluid flow from the tapered power nozzles 110, 112 creates moving vortices which generate a fluid oscillation within interaction chamber 114 and produces a first oscillating spray or fluid stream 86 from first-side outlet aperture 116 at outlet end 54, in known manner. Thus there are three sections of passages molded into the first or top side of insert 30, and they are configured in serial fashion (or in series) having, from inlet to outlet, the first fluid filtering section or subchamber 80, the first pass-through chamber 106 (which includes bypass lumen 170) and the first fluidic oscillator 50.

Figure 5:
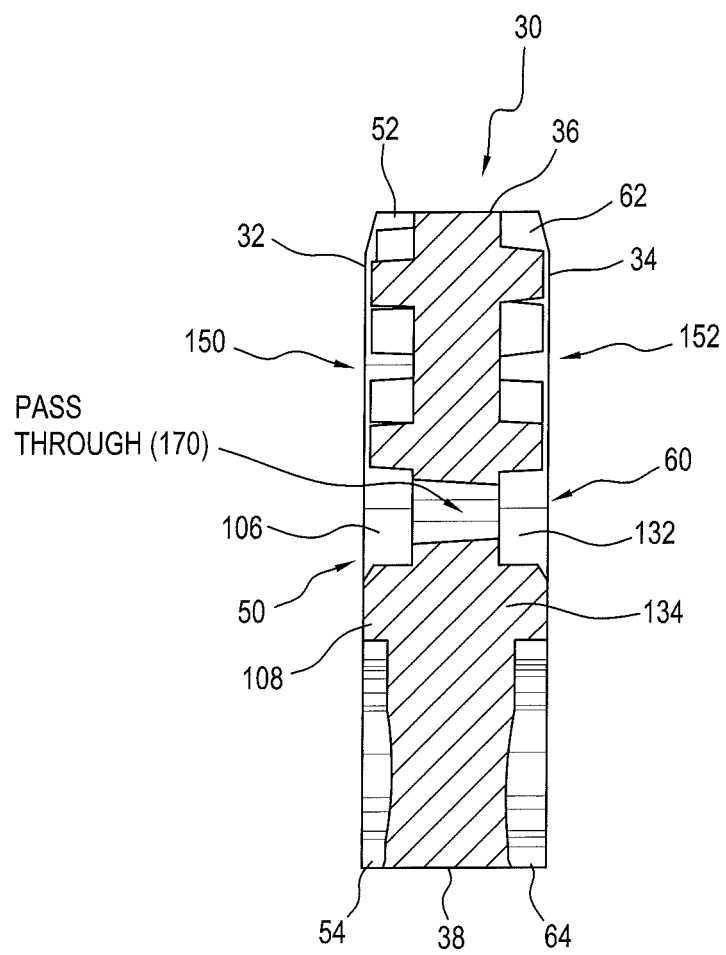
FIG. 5 is a cross-sectional view taken along line A-A of FIG. 4, in accordance with the present invention.
Figure 6:
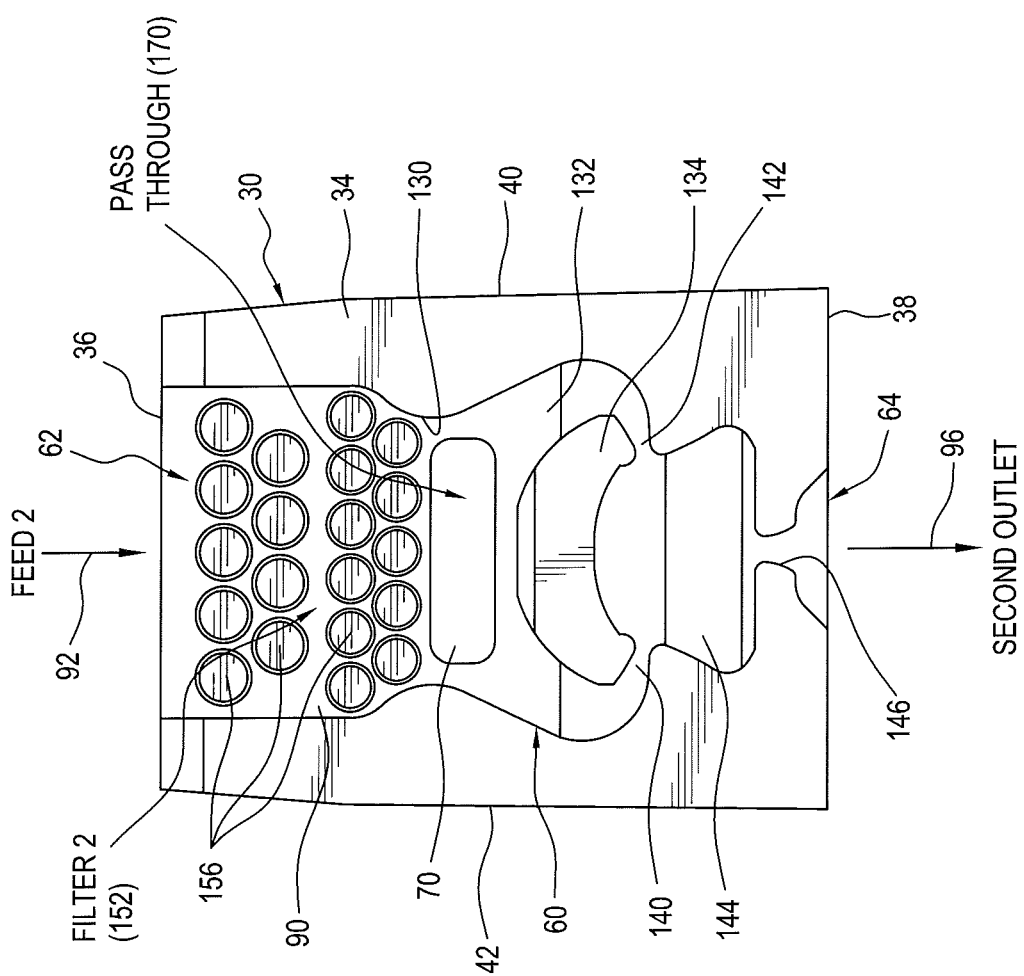
FIG. 6 is a bottom plan view of the substrate of FIG. 3 illustrating the second side's filter section, proximate the second side's feed from the fluid supply which provides filtered fluid flow to the transverse bypass lumen and then to the second side's fluidic oscillator section which creates a second spray from the second side's outlet orifice.

There are also three sections of passages molded into the second or bottom side 34 of substrate 30 as illustrated in FIG. 6 and they are similar to those illustrated in FIG. 4, but the filtering chamber differs. Referring now to FIG. 6, the second fluid filtering subchamber 90 has a simpler filter chamber geometry which eliminates the curved sidewall segment 102 illustrated in FIG. 4. Thus, the second fluid filtering subchamber 90 supplying second fluidic circuit 60 is generally rectangular, and leads fluid 92 through a narrow exit throat portion 130 to a second side pass-through chamber 132 which includes the other end of bypass lumen 170, so second side pass-through chamber is in continuous fluid communication with first-side pass through chamber 106. Downstream from second side pass-through chamber 132 is the second fluidic oscillator's fluid dynamic structural members including a curved baffle 134 which cooperates with the side walls defining second fluidic circuit 60 to form a second pair of spaced, inwardly tapering power nozzles 140 and 142 which accelerate and direct fluid 92 flowing therethrough into the second fluidic oscillator's interaction chamber 144. The fluid from the nozzles interacts in the chamber 144 to produce an oscillation in the chamber 144 and an outlet fluid stream 96 through an outlet aperture 146, in known manner. FIG. 5 is a cross-section of the substrate 30, taken along line A-A of FIG. 4, and illustrating the fluidic circuits 50 and 60 on the top and bottom of the substrate. As with the first side, there are three sections or passages molded into the second or bottom side of insert 30, and they are configured in serial fashion (or in series) having, from inlet to outlet, the second fluid filtering section or subchamber 90, the second pass-through chamber 132 (which includes the other end of bypass lumen 170) and the second fluidic oscillator 60.

The unitary, integral multiple-circuit fluid spray nozzle device of the invention incorporates first and second integrated filter arrays 150 and 152 in the respective first and second fluidic circuits 50 and 60 that are formed in the first and second opposing sides of the molded fluidic chip member or substrate 30. Each filter incorporates an array formed of plural spaced posts or pillars, posts 154 in filter 150 and posts 156 in filter 152, for example. These posts may have a selected cross-sectional shape, and are so located and spaced in the fluidic circuits as to trap loose particles or other contaminants in the fluid to prevent clogging of the respective power nozzles 110, 112 or 140, 142 or the corresponding outlet apertures 116, 146. As described in the aforesaid '409 and '658 patents, the spaced posts provide additional flow passages through the circuits if one or more of the passages between adjacent posts become clogged, allowing the corresponding fluid outlet orifices to continue to function in spite of a partial blockage. The spacing between adjacent posts in each of the filters is selected to allow a continuing flow from an input end to its corresponding outlet end.

As illustrated, the spray nozzle of the present invention incorporates two fluidic circuits operating in parallel and defining parallel fluid paths from two input streams of fluid, typically from a common source, under pressure as indicated by arrows 82 and 92 to supply fluid to two outlet spray orifices, 116 and 146. However, as noted above, even in multiple fluidic circuit nozzles such as these, integrated filters such as those defined by arrays of spaced posts 154 or 156 can be substantially clogged by a single large piece of debris such as cardboard, paper, or packaging materials, and if one of the inlet filter sections (e.g., 80 or 90) becomes significantly clogged, the flow to that side's corresponding outlet is clogged, and the resulting outlet spray is reduced, so the multi-circuit nozzle produces no better a result than is obtained if a fluidic circuit's internal orifice is clogged, because the nozzle assembly is rendered significantly less effective for creating and maintaining the desired spray.

To overcome this problem, and to maintain the outlet flow from both orifices of a multi-circuit nozzle device, a transverse flow pass-through, or bypass lumen 170 is provided through the body of the substrate between the top and bottom pass-through chambers 110 and 132 that are downstream of the filters 150 and 152, respectively, to interconnect the first and second fluidic circuits 50 and 60. As illustrated, the lumen 170 may be generally rectangular in cross-section, with rounded corners to facilitate flow and is in fluid communication with and between the upper and lower circuits 50 and 60 to enable condition responsive cross-flow or shared flow between the filter arrays in each circuit with the outlets of the opposite circuits. Each side's filter section and the pass-through lumen are made with enough cross sectional flow-accommodating area to allow for full flow to each of the fluidic circuit outputs, but with small enough filter spacing to strain debris from the inlet fluid and prevent clogging of the various orifices in the fluidic circuits and to maintain sprays from both side's outlet orifices in case one side's filter section is occluded or blocked. The integral, inter-circuit bypass lumen 170 thus extends between the top side fluidic circuit 50 and the bottom side fluidic circuit 60 to provide an alternate path for input fluid to reach both of the outputs 54 and 64 even if one of the inlet fluid filters should become clogged.

Figure 7:
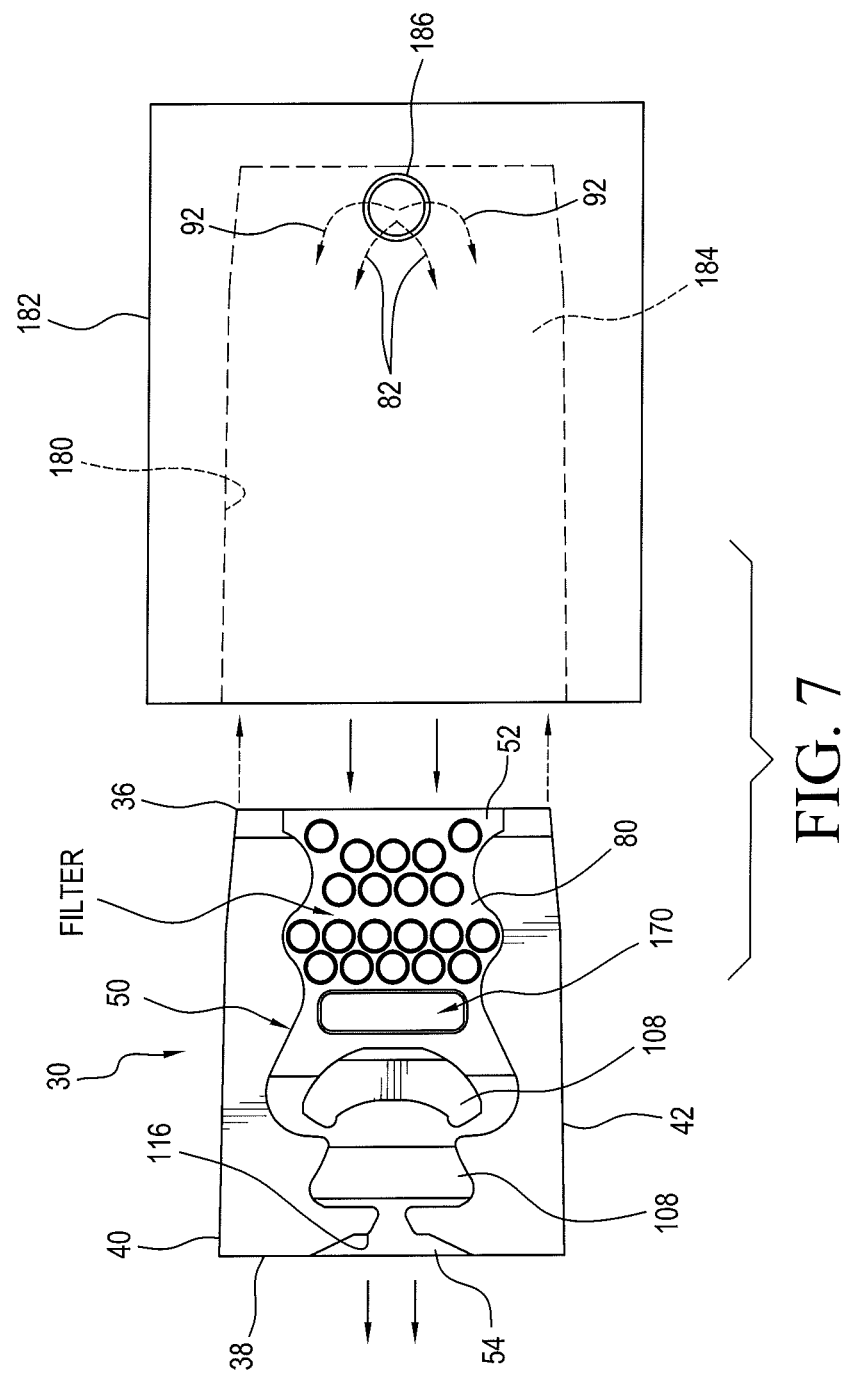
FIG. 7 is a top plan view illustrating a spray nozzle assembly including a housing configured to receive, support and provide pressurized fluid to the two-sided fluidic oscillator circuit substrate or insert of FIGS. 3-6, and showing the orientation of the nozzle assembly's fluid inlet.

In an exemplary embodiment illustrated in FIG. 7, the nozzle substrate 30 of the present invention is tightly secured in a cavity 180 of a housing 182 to provide top and bottom cavity walls to contact the top and bottom surfaces 32 and 34 of the substrate to enclose the fluidic circuits on the opposite surfaces of the substrate and to allow the outlet orifices 116 and 146 to be in communication with the ambient surroundings. The housing's cavity 180 is elongated so that when the substrate is in place within the housing it provides a fluid supply chamber 184 at the inlet end 36 of the substrate. A fluid inlet pipe or barb 186 connected to a suitable source to provide fluid under pressure is in fluid communication with the chamber 184 and thus with the inlets 52 and 62 to the fluidic circuits 50 and 60. Fluid to be sprayed is introduced to the interior of the housing from the source of pressurized fluid, such as a cleaner liquid for windshield washers, via inlet pipe 20 and enters the fluidic circuits 50 and 60 within the housing, as indicated by flow arrows 82 and 92. Since the inlet flows 82 and 92 are from a common source of pressurized fluid, there is sufficient flow to maintain the two outlet sprays even when one of the filters becomes partially or completely clogged, since clog-condition responsive compensating flow is available from the other filter via the bypass lumen 170.

Referring now to FIGS. 4, 5 and 6, in normal operation, inlet fluid 82 flows into the fluid circuit 50 formed in the top surface of substrate 30 and flows through first-side filter 150, through first filtered fluid supply orifice or throat 104, and then through power nozzles 110 and 112 to oscillation chamber 114 to produce outlet spray 86 from output orifice 116, while at the same time inlet fluid 92 flows into the second side fluid circuit 60 formed in the bottom surface of the substrate may flow through second fluid filtering subchamber 90 via throat 130 and then through power nozzles 140 and 142 to second-side oscillation chamber 144 to produce a second output spray 96 from orifice 146, thereby producing a desired two-spray output pattern. If debris should clog one of the filters, for example first-side filter 150, the resulting reduced flow of inlet fluid 82 in fluidic circuit 50 would ordinarily tend to reduce its corresponding outlet spray or flow 86, but, in accordance with the present invention, the blockage creates a compensating flow wherein a compensating portion of the inlet fluid flow 92 to fluidic circuit 60 will flow through transverse bypass lumen 170 to transfer enough of the second side's inlet flow 92 into the first side's fluidic circuit 50 maintain the first side's spray output 86. Since a common fluid source supplies both inlet streams 82 and 92, the fluid source is sufficient not only to compensate for reduced flow in through fluidic circuit 50 to maintain outlet spray 86, but to also maintain output spray 96, so that both of the two spray outputs are maintained at substantially constant levels. Similarly, if second side filter 152 in fluidic circuit 60 becomes partially or fully blocked, first side's inlet flow 82 will compensate for that blockage by supplying fluid through bypass lumen 170 to maintain the second side's spray outlet 96 as well as its corresponding outlet 86.

Although the use of two filtered fluidic circuits on opposite sides of a substrate are illustrated, it will be apparent that the multi-circuit nozzle of the invention is not limited to two circuits; for example, if desired an additional filtered fluidic circuit can be added to one or both of the sides of the substrate with a suitable pass-through lumen, or lumens, interconnecting selected or all of the fluidic circuits downstream of the filters to allow full flow to the outlets of the oscillator circuits even if one circuit's inlet fluid filter is clogged. Referring particularly to the exemplary embodiment illustrated in FIG. 4, the multiple fluid circuit spray insert 30 has transverse lumen 170 configured as a substantially rectangular or oval (not shown) passage which has a lateral width which is symmetrical about central axis A-A and bypass lumen or passage 170 terminates in opposing lateral passage sides 170A, 170B. The first side's fluid oscillator 50 is a multiple power nozzle-type oscillator having first and second power nozzle lumens or passages 110, 112 with power nozzle inlets 110A, 112A which are equally spaced from the transverse bypass lumen's opposing lateral passage sides 170A, 170B.

In the illustrated embodiments, the fluidic circuit subchambers are in fluid communication with fluidic oscillators and, in the embodiments illustrated in FIGS. 3, 4 and 6, each oscillator comprises a mushroom oscillator having first and second tapered power nozzles configured to generate first and second jets which collide in an oscillating chamber to generate an oscillating spray which projects from a corresponding outlet throat or exit orifice to project the spray distally into the ambient atmosphere. Each filter array and the pass through 170 are made with enough cross sectional lumen (flow accommodating) area to allow for full flow to both of the first and second fluidic circuits but with small enough inter-post filter spacing to strain debris from the inlet fluid and prevent clogging of the orifices in the fluidics.

In summary, persons of skill in the art will appreciate that the fluid circuit substrate and structure of the present invention makes available a multiple fluid circuit or multi-level liquid spray device, comprising an input port 20 defining a first inlet fluid feed 82 and a second inlet fluid feed 92; a fluid oscillator circuit substrate or chip 30 having, optionally, first and second fluidic circuits 50 and 60 defined in first and second sides 32 and 34 and an output end 38 which is transverse to the first and second sides and a plane between the sides. The molded geometry in the first side includes a first fluid filtering subchamber 80 having an upstream and a downstream end and a first filter post array 150 comprising a first series of spaced posts 154 forming a first filter dividing the upstream end of the first subchamber 80 from the downstream end of the first subchamber with the upstream end being in registry with and defining the first fluid inlet 52 to receive a suitable fluid such as a liquid from a source of liquid.

The molded geometry of the second side 34 of substrate 30 includes a second subchamber 90 having an upstream and a downstream end and a second filter post array 152 comprising a second series of spaced posts 156 forming a second filter dividing the upstream end of the second subchamber 90 from the downstream end of the second subchamber 90 with the upstream end being in registry with and defining the second inlet fluid feed 62 to receive liquid from the source of liquid. There is a bypass or inter fluidic circuit lumen 170 connecting the first and second subchambers downstream of the filter arrays. As illustrated in FIGS. 3-6, the first side of the fluid oscillator chip's first fluidic circuit 50 has intercircuit transverse bypass lumen or liquid flow path 170 open from the downstream end of the first subchamber 80 to the downstream end of the second subchamber 90.

In the embodiment illustrated, the first fluid oscillator circuit 50 has at its output end 54 an outlet throat and an outlet orifice 116 in communication with ambient space in order to spray liquid into that space. Similarly, the second fluid oscillator circuit has at its output end 64 an outlet throat and an outlet orifice 146 in communication with ambient space to spray liquid into that space. A housing (such as housing 16 of FIG. 1) includes and defines the input port 20 which is in fluid communication with the inlet ends 52 and 62 of respective circuits 50 and 60, and encloses the oscillator circuit chip 30, whereby the inlet port simultaneously provides inlet fluid to the first inlet fluid feed 52 and to the second inlet fluid feed 62. Fluid flowing through either of the two fluidic circuits may pass through transverse lumen 170 and into the opposite fluidic oscillator as needed to automatically maintain the spray from both outlets if either of the inlet filters 150 or 152 becomes clogged.

The multi-circuit liquid spray device of the present invention may employ any one of a variety of different fluid circuits. For example the first fluidic oscillator may have a silhouette be selected from a reversing chamber oscillator or a multiple power nozzle-type oscillator or a feedback-type oscillator. The second side of fluidic substrate 100 may also have any of those types of oscillator.

In another form of the invention a spray nozzle with a single output spray and redundant input filters may be provided. In this case, one fluidic circuit (for example 50) extends from its input (for example 52) through its first filter 150 and its oscillator 114 to spray aperture 54. The second fluidic circuit (60) is modified so that it has no oscillator or spray outlet at all (not shown), in which case the second inlet feed 62 supplies fluid through filter 152 in fluidic circuit 60 and through bypass lumen 170, also to oscillator 114 and to spray outlet aperture 54. In this embodiment (and method) the fluid entering both inlets 52 and 62 is supplied through corresponding filters 150 and 152 to the single spray output, so if either filter becomes clogged, the output spray is maintained with flow of filtered fluid through the unclogged filter. To provide a specific example of the method and operation of the present invention, as noted above, transverse bypass lumen 170 is configured as a rectangular or oval passage which has a lateral width which is symmetrical about central axis A-A and terminates in opposing lateral passage sides 170A, 170B, and the first fluid oscillator 50 is a multiple power nozzle-type oscillator having first and second power nozzle lumens or passages 110, 112 with power nozzle inlets 110A, 112A which are equally spaced from said transverse lumen's opposing lateral passage sides 170A, 170B, so bypass fluid flow is driven by fluid pressure equally into the power nozzles. When first filter 150 is clogged, fluid flows through transverse bypass lumen 170 (from the second side's second filter 152 and flows substantially equally into the first and second power nozzle lumens or passages 110, 112, to generate and maintain stable oscillations within and spray from first side fluidic 50.

The novel method of the present invention, broadly speaking, incorporates steps for maintaining constant fluid spray outputs in a multi-circuit fluidic spray device even if one of the circuits becomes partially or completely clogged by debris in the supplied fluid. The method includes supplying at least first and second parallel fluidic circuits simultaneously, using, for example, fluid from a common source of fluid under pressure to provide first and second output sprays in a desired spray pattern. The method includes directing the fluid flowing in each of the parallel circuits through corresponding first and second fluid flow paths to respective first and second spray outlets, filtering the fluid in each of the fluid flow paths; and compensating for an unexpected filter blockage in a first one of the fluid flow paths by directing a portion of fluid flow in a second one of the fluid flow paths to the first one of the flow paths to maintain constant flow at both of the spray outlets.

It will be seen from the foregoing that the present invention is also directed to a method of compensating for filter blockage in one of multiple generally parallel fluidic circuits in a spray nozzle or the like. In the case of two fluidic circuits on a single substrate, the method includes directing the fluid flow in each of the circuits through corresponding first and second fluid flow paths incorporating corresponding fluid filters, and supplying filtered fluid in each of the first and second flow paths to corresponding first and second oscillation chambers via respective power nozzles to direct oscillating fluid to respective spray outlets. Compensating for filter blockage in a first one of the fluid flow paths comprises directing a portion of fluid flow in the second one of the fluid flow paths to the first one of the flow paths by way of a bypass lumen extending between the circuits downstream of filters in each of said flow streams. Similarly, compensating for filter blockage in the second one of the fluid flow paths comprises directing a portion of fluid flow in the first one of the fluid flow paths to the second one of the flow paths by way of the same bypass lumen extending between the circuits downstream of filters in each of said flow streams.

Having described preferred embodiments of a new and improved method, it is believed that other modifications, variations and changes will be suggested to those skilled in the art in view of the teachings set forth herein. It is therefore to be understood that all such variations, modifications and changes are believed to fall within the scope of the present invention as set forth in the claims.

What is claimed is:

1. A multiple fluid circuit spray device, comprising:

a fluid oscillator circuit substrate or chip having an input end, at least first and second fluidic circuits defined in first and second sides, and an output end which is transverse to said first and second sides and a plane between said sides;

said first side including a first filter subchamber having an upstream end and a downstream end and a first filter dividing the upstream end of said first filter subchamber from the downstream end of said first filter subchamber, with said upstream end being in registry with said input end to receive liquid from a source of pressurized fluid;

said second side including a second filter subchamber having an upstream end and a downstream end and a second filter dividing the upstream end of said second filter subchamber from the downstream end of said second filter subchamber with said upstream end being in registry with said input end to receive liquid from a source of pressurized fluid;

an inter-circuit transverse bypass lumen or liquid flow path positioned downstream of the first filter subchamber and downstream of the second filter subchamber;

said first fluidic circuit having an inlet in communication with said first filter subchamber and with said inter-circuit transverse bypass lumen or liquid flow path, wherein said first fluidic circuit includes an outlet throat leading through an outlet orifice to ambient at said output end to generate a first spray of said fluid to ambient; and said second fluidic circuit having an inlet in communication with said second filter subchamber and with said inter-circuit transverse bypass lumen or liquid flow path, wherein said second fluidic circuit includes an outlet throat leading through an outlet orifice to ambient at said output end to generate a second spray of said fluid to ambient.

2. The multiple fluid circuit spray device of claim 1, wherein said inter-circuit transverse bypass lumen or liquid flow path is configured as a rectangular or oval passage which has a lateral width which is symmetrical about a central axis and terminates in opposing lateral passage sides, and said first fluidic circuit is a multiple power nozzle oscillator having first and second power nozzle lumens or passages with power nozzle inlets which are equally spaced from opposing lateral passage sides of the inter-circuit transverse bypass lumen or liquid flow path.

3. The multiple fluid circuit spray device of claim 2, wherein said second fluidic circuit is at least one of a reversing chamber oscillator, a multiple power nozzle oscillator, and a feedback oscillator.

4. The multiple fluid circuit spray device of claim 1, further comprising a nozzle housing for enclosing said fluid oscillator circuit substrate or chip and including at least one fluid inlet port.

5. The multiple fluid circuit spray device of claim 4 wherein said at least one fluid inlet port simultaneously and continuously provides inlet fluid to said upstream ends of said first inlet and said second inlet, whereby inlet fluid flowing through said first or second filter subchambers may pass through said inter-circuit bypass lumen or liquid flow path and into said first or second fluidic circuits.

6. A method for maintaining a selected outlet spray pattern in a multi-outlet multiple fluid circuit spray device, comprising:
providing a fluid oscillator circuit substrate or chip having an input end, first and second sides, and an output end which is transverse to said first and second sides and a plane between said sides;
defining at least first and second fluidic circuits in said first and second sides, respectively;
incorporating in said first fluidic circuit a first filter subchamber having an upstream end and a downstream end and a first filter dividing the upstream end of said first subchamber from the downstream end of said first filter subchamber, with said upstream end being in registry with said input end to receive liquid from a source of liquid;
incorporating in said second fluidic circuit a second filter subchamber having an upstream end and a downstream end and a second filter dividing the upstream end of said second filter subchamber from the downstream end of said second filter subchamber, with said upstream end being in registry with said input end to receive liquid from said source of liquid;
defining an inter-circuit transverse bypass lumen or liquid flow path positioned downstream of the first filter subchamber and downstream of the second filter subchamber;
incorporating in said first side, an inlet in communication with said first filter subchamber and with said inter-circuit transverse bypass lumen or liquid flow path; and an outlet throat leading through an outlet orifice to ambient at said output end to spray said fluid to ambient;
incorporating in said second side, an inlet in communication with said second filter subchamber and with said inter-circuit transverse bypass lumen or liquid flow path; and an outlet throat leading through an outlet orifice to ambient at said output end to spray said fluid to ambient;
enclosing said fluid oscillator circuit substrate or chip in a housing having at least one fluid inlet port; and wherein said at least one fluid inlet port is configured to simultaneously provide inlet fluid to said upstream ends of said first and second filter subchambers, whereby inlet fluid flowing through said first or second filter subchambers may pass through said inter-circuit transverse bypass lumen or liquid flow path and into said first or second fluidic circuits.

7. The method of claim 6, wherein the step of defining at least first and second fluidic circuits includes providing at least one of a reversing chamber oscillator, a multiple power nozzle oscillator, and a feedback oscillator.

8. The method of claim 6, wherein said inter-circuit transverse bypass lumen or liquid flow path is configured as a rectangular or oval passage which has a lateral width which is symmetrical about a central axis and terminates in opposing lateral passage sides, and said first fluid circuit is a multiple power nozzle oscillator having first and second power nozzle lumens or passages with power nozzle inlets which are equally spaced from said opposing lateral passage sides of said inter-circuit transverse bypass lumen or liquid flow path.

9. The method of claim 8, wherein, when said first filter is clogged, fluid flows through said inter-circuit transverse bypass lumen or liquid flow path from said second filter and flows substantially equally into said first and second power nozzle lumens or passages.

* * * * *